US011388919B2

United States Patent
Davidek et al.

(10) Patent No.: US 11,388,919 B2
(45) Date of Patent: Jul. 19, 2022

(54) PROCESS FOR THE PREPARATION OF HEAT TREATED CEREAL BASED FOOD PRODUCTS

(71) Applicant: Société des Produits Nestlé S.A., Vevey (CH)

(72) Inventors: Tomas Davidek, Correvon (CH); Frédéric Mantilleri, Morges (CH); Ondrej Novotny, Cugy (CH); Luca Salvatore Ruffino, Pontarlier (FR); Dietmar August Gustav Sievert, Saint-Sulpice (CH); Ulrich Zürcher, Scarborough (CA)

(73) Assignee: Societe des Produits Nestle S.A., Vevey (CH)

( * ) Notice: Subject to any disclaimer, the term of this patent is extended or adjusted under 35 U.S.C. 154(b) by 76 days.

(21) Appl. No.: 16/484,397

(22) PCT Filed: May 4, 2018

(86) PCT No.: PCT/EP2018/061524
§ 371 (c)(1),
(2) Date: Aug. 7, 2019

(87) PCT Pub. No.: WO2018/202863
PCT Pub. Date: Nov. 8, 2018

(65) Prior Publication Data
US 2021/0137145 A1    May 13, 2021

(30) Foreign Application Priority Data
May 5, 2017   (EP) .................................. 17169824

(51) Int. Cl.
A23L 27/20      (2016.01)
A23L 7/10       (2016.01)
(Continued)

(52) U.S. Cl.
CPC ............ *A23L 27/2056* (2016.08); *A21D 8/02* (2013.01); *A21D 8/06* (2013.01); *A21D 10/007* (2013.01); *A23L 7/1975* (2016.08)

(58) Field of Classification Search
USPC .................................................. 426/534, 537
See application file for complete search history.

(56) References Cited

U.S. PATENT DOCUMENTS

2008/0138472 A1* 6/2008 Alexandre .............. A23L 33/21
                                                              426/104
2013/0260000 A1* 10/2013 Lian Hwee Peng .... A23L 23/00
                                                              426/533
(Continued)

FOREIGN PATENT DOCUMENTS

EP        1266581 A1     12/2002
JP     2015065832 A       4/2015
(Continued)

OTHER PUBLICATIONS

Wenzl et al., "Validation by Collaborative Trial of an Isotope Dilution Liquid Chromatographic Tandem Mass Spectrometric Method to Determine the Content of Acrylamide in Roasted Coffee", Food Additives & Contaminants: Part A, 40 pages, Mar. 5, 2011.
(Continued)

*Primary Examiner* — Lien T Tran
(74) *Attorney, Agent, or Firm* — K&L Gates LLP

(57) ABSTRACT

The present invention relates to a new process to prepare heat treated cereal based food products enriched in certain flavours and to the heat treated cereal based food products obtainable by this process. Additionally, the present invention relates to a process to generate a pre-reacted fraction and to the pre-reacted fraction itself. Such pre-reacted fraction can be used in the process of the invention to prepare heat treated cereal based food products.

18 Claims, 10 Drawing Sheets

(51) Int. Cl.
*A21D 8/02* (2006.01)
*A21D 8/06* (2006.01)
*A21D 10/00* (2006.01)

(56) References Cited

U.S. PATENT DOCUMENTS

2015/0342223 A1   12/2015  Lin et al.
2018/0042279 A1    2/2018  Kerler et al.

FOREIGN PATENT DOCUMENTS

| WO | 9933358 A1 | 7/1999 |
| WO | 03007725 A2 | 1/2003 |
| WO | 2009011589 A1 | 1/2009 |
| WO | 2009011598 A1 | 1/2009 |

OTHER PUBLICATIONS

Bujard et al., "Measure of Available and Blocked Lysine in Industrial Milks. Ann Nutr Alim", vol. 32, pp. 291-305, 1978.
Rychlik et al., Compilation of Odor Thresholds, Odor Qualities and Retention Indices of Key Food Odorants, German Research Center for Food Chemistry, 1998, 33 pages.
International Search report and written opinion received for application No. PCT/EP2018/061524, dated Jul. 2, 2018, 13 pages.
Russia Patent Office Communication for Application No. 2019138472/10(075956) dated Dec. 6, 2021, 13 pages.

* cited by examiner even pick nited States Patent

PROCESS FOR THE PREPARATION OF HEAT TREATED CEREAL BASED FOOD PRODUCTS

CROSS REFERENCE TO RELATED APPLICATIONS

This application is a national stage application filed under 35 USC § 371 of International Application No. PCT/EP18/061524, filed Nov. 4, 2018, which claims priority to EP Application No. 17169824.4 filed May 5, 2017. The entire contents of the above-referenced patent applications are hereby incorporated herein by reference.

FIELD OF THE INVENTION

The present invention relates to a new process to prepare heat treated cereal based food products enriched in certain flavours and having unique flavour profiles and to the heat treated cereal based food products obtainable by this process. Additionally, the present invention relates to a process to generate a pre-reacted fraction of ingredients and to the pre-reacted fraction itself. Such enriched pre-reacted fraction can be used in the process of the invention to prepare heat treated cereal based food products.

BACKGROUND OF THE INVENTION

Together with its colour and texture, the flavour of a product, comprising the aroma (volatile compounds) and the taste (non-volatile compounds) of a product, has been recognised as one of the main drivers for consumers' food preference.

There is nonetheless a common trend driven by consumer perception to eliminate or replace flavouring ingredients that are artificial or not natural and which are added to the recipes on top of the basic ingredients.

Thus typical flavour characteristics of many foodstuffs are ideally generated directly from recipes' raw materials during thermal processes such as roasting, frying, drying, baking, toasting, cooking, extrusion etc. without addition of artificial/non-natural ingredients to the recipe. In all these processes, Maillard reaction plays a central role in the formation of flavours and colour.

For baked cereal based products for example, the consumer typically expects to find in the product marked biscuit, toasty and/or caramel flavour notes. Additionally, the visual appearance should correspondingly be characterized by brown colour notes which are also known to be appreciated by the consumer for such baked cereal based products.

A common approach to the improvement of organoleptic properties (colour and flavour) of cereal based food products is to increase residence time during cooking and/or the temperature of heat treatment, yet an increase in residence time reduces the throughput that is a significant drawback for factory production. More extensive heating also has a negative impact on a nutritional value (e.g. lysine blockage) and a food safety (generation of process contaminants) and can result in modification of the texture. Thus, there is a need to deliver and/or enhance preferred consumer notes (for example biscuit, toasty and/or caramel notes) in baked cereal based products without the need to add to the recipe ingredients which are not natural, artificial or which can't be derived directly from the recipe's raw material ingredient. There is also a need to have baked cereal based food products enhanced in preferred consumer flavour notes and having an appropriate visual appearance in terms of colour.

v Thus, there is also a need to deliver and/or enhance preferred consumer notes (for example biscuit, toasty and/or caramel notes) in baked cereal based products without the need to add to the recipe ingredients which are artificial, not natural, or which can't be derived directly from the recipe's raw materials while at the same time not introducing significant drawback for factory production and/or having a negative impact on nutritional value (lysine blockage), safety (generation of process contaminants) or the texture of the product.

Additionally, reduction of sugar (sucrose) in foods is currently a global trend driven by consumer perception worldwide. Sucrose reduction has a significant impact on the flavour of cereal based products, as it leads among other things to lower biscuit, caramel and/or toasty flavour notes. Thus, there is also a need to preserve flavour intensity as much as possible in the event of a reduction of sugars so as to maintain consumer preference.

The inventors have surprisingly found that at least one or more of the above mentioned problems may be solved by using the process according to the present invention.

SUMMARY OF THE INVENTION

The inventors have surprisingly found that by using the process according to the present invention heat treated cereal based food products can be obtained wherein the amount of certain flavour compounds (odorants), which are important to confer to the product toasty and/or biscuit notes, is consistently and selectively increased.

Accordingly, several aspects of the present invention are detailed below as follows.

In one aspect, the present invention relates to a process for the preparation of heat treated cereal-based food product, the cereal-based food product comprising cereal-based ingredient, bulking agent, reducing sugar, dairy ingredient, and fat, the process comprising the steps of: (i) providing ingredients comprising cereal-based ingredient, a bulking agent, reducing sugar, dairy ingredient, fat and water (ii) combining them to form a cereal-based food preparation, (iii) subjecting the cereal-based food preparation to heat treatment and (iv) drying the cereal-based food product obtainable from step (iii),
wherein said process is characterized in that it comprises the steps of:
(a) Separating a portion of ingredients comprising water, bulking agent, dairy ingredient, reducing sugar and fat and forming a wet mixture thereof;
(b) subjecting the wet mixture to a heat treatment at a temperature comprised between 100 and 150° C., for example 110 and 140° C., under a pressure comprised between 2 and 7 bars, for example between 3 and 6 bars, for a time comprised between 5 and 20 min to produce a pre-reacted fraction, and then
(c) combining the pre-reacted fraction with the remainder of ingredients to form a cereal based food preparation, whereby the pre-reacted fraction is added in an amount comprised between 3 and 30 dry weight % of the cereal based food preparation, for example between 5 and 20 dry weight % of the cereal based food preparation.

In another aspect, the present invention relates to a heat treated cereal-based food product wherein:
a) the ratio between concentrations of 2-acetyl-1-thiazole to 4-vinylguaiacol is equal or higher than 0.02 and the ratio between concentrations of 2-acetyl-1-thiazoline to 4-vinylguaiacol is equal or higher than 0.02; and/or b) the ratio between concentrations of 2-acetyl-1-thiazole to 3-methylbutanal is equal or higher than 0.035 and the ratio between concentrations of 2-acetyl-1-thiazoline to 3-methylbutanal is equal or higher than 0.04.

In a further aspect, the present invention relates to a process for the preparation of a pre-reacted fraction which comprises:
(a) providing water, bulking agent, dairy ingredient, reducing sugar and fat and forming a wet mixture thereof having total solid contents comprised between 65 and 90% at a temperature comprised between 60 and 80° C.;
(b) subjecting the wet mixture to a heat treatment at a temperature comprised between 100 and 150° C., for example between 110 and 140° C., under a pressure comprised between 2 and 7 bars, for example between 3 and 6 bars, for a time comprised between 5 and 20 min to produce a pre-reacted fraction.

In a still further aspect, the present invention provides a pre-reacted fraction which is obtainable by a process comprising:
(a) providing water, bulking agent, dairy ingredient, reducing sugar and fat and forming a wet mixture thereof having total solid contents comprised between 65 and 90% at a temperature comprised between 60 and 80° C.;
(b) subjecting the wet mixture to a heat treatment at a temperature comprised between 100 and 150° C., for example between 110 and 140° C., under a pressure comprised between 2 and 7 bars, for example between 3 and 6 bars, for a time comprised between 5 and 20 min to produce a pre-reacted fraction.

BRIEF DESCRIPTION OF THE DRAWINGS

Additional features and advantages of the present invention are described in, and will be apparent from, the description of the presently preferred embodiments which are set out below with reference to the drawings in which:

FIG. 4 reports monadic sensory profiles of cereal roller-dried products prepared as described in Examples 1-3 (as described in Example 6.

DETAILED DESCRIPTION OF THE INVENTION

Definitions of Terms

Figure 1:
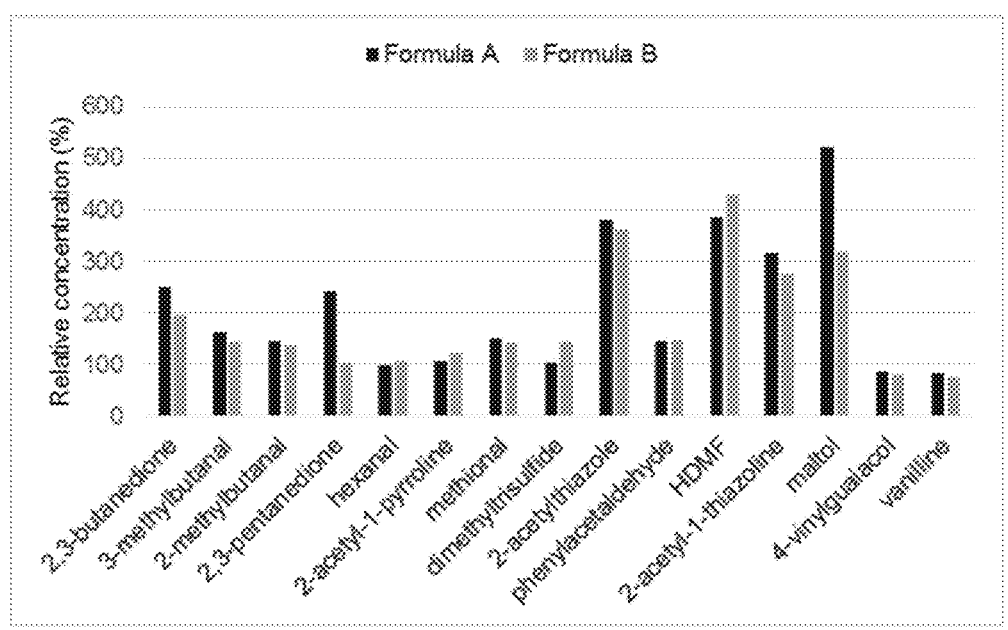
FIG. 1 is graphical representation of relative concentration of odorants present in the product containing pre-reacted fraction of ingredients as compared to product made by conventional approach without pre-reaction (set at 100%) as described in Example 4.

In the context of the present invention, when content of one ingredient is expressed as or "w/w", it indicates weight percentage (the ratio or percentage of one substance out of the total) of the ingredient in the composition.

In the context of the present invention, when content of one ingredient is expressed as "w/w dry matter" or "dry w/w", it indicates dry weight percentage (the ratio or percentage of one substance out of the total) of the ingredient in the dry composition it is referred to.

In the context of the present invention the expression, "concentration ratio" indicates the ratio between concentrations of odorants measured in the same sample of heat treated cereal product.

Within the context of the present invention, the term "comprised between value X and value Y" is to be intended to mean that the described parameter may assume any value in the identified interval/range as well as the values defining the interval range (i.e. X and/or Y).

Within the context of the present invention, the term "heat-treated food product" or "heat-treated product" identifies edible products which are obtained via heat treatments of food preparation as below defined and which may be consumed directly or may be used as an ingredient for further processing to prepare an edible or potable product.

Within the context of the present invention, "heat treatment" identifies a processing step wherein a food preparation as below defined can be microbiologically, physically and/or chemically modified as an effect of application of high temperature for a given time. Non-limiting examples of heat treating techniques are: oven baking, wafer baking, puffing, roller drying, extrusion, toasting, cooking, roasting, spray drying and/or frying. Typically, the temperatures for heat treatments ranges from 70 to 270° C.

Within the context of the present invention, the term "heat-treated cereal-based food product" or "heat-treated cereal-based product" identifies heat treated products as above defined which are obtained via heat treatment of a food preparation comprising at least a cereal-based ingredient.

Non limiting examples of heat-treated cereal-based food products according to the present invention are: biscuits, wafers, breakfast cereals, powdered cereal products meant to be reconstituted in porridges, paps and/or beverages, bread, ice-cream cones, pizza, bread sticks, bread replacers, bakery products, cakes, muffins, pasta and the like.

Within the context of the present invention, the term "infant cereal product" relates to a powdered instant cereal product that has been designed specifically for infants in order to provide the required nutritional contribution to the infant.

Within the context of the present invention, the term "food preparation" identifies a mixture of ingredients which is meant to deliver a "heat treated food product" after being subjected to heat treatment. Non limiting examples of "food preparation" are: batters, doughs, slurries, soups, mixtures comprising cereal-based ingredients mixtures comprising cereals and milk powder, mixtures comprising milk powder and flour, mixtures comprising sugar and flour, mixtures comprising flour, fats and sugar, and the like.

Within the context of the present invention, the term "cereal-based ingredient" or "cereal ingredient" identifies an ingredient derived from cereals.

Non limiting examples of cereal-based ingredients are: flour, starch, hydrolysed starch such as for example maltodextrine, gluten, cereal fibres, bran, germ, hull and mixtures thereof. Non limiting examples of cereals from which cereal-based ingredients may be derived are: wheat, oat, corn, rice, sorghum, spelt, barley, buckwheat, bulgur, millet, amaranth, quinoa, rye, teff, triticale and the like.

Within the context of the present invention, the term "cereal flour" identifies a cereal based ingredient as above defined which may be refined or whole grain flour and which may derive from wheat, oat, corn, rice, sorghum, spelt, barley, buckwheat, bulgur, millet, amaranth, quinoa, rye, teff, triticale or mixtures thereof.

Within the context of the present invention, the expression "cereal based food preparation" identifies a food preparation as above defined which comprise at least one cereal-based ingredient.

Within the context of the present invention, the term "dairy ingredient" identifies protein containing ingredients derived from mammal milk for example cow, goat and/or buffalo or mixtures thereof. Non limiting examples of such ingredients comprise: fresh milk, concentrated milk, milk powder, whole milk, skimmed and/or semi-skimmed milk, whey proteins, buttermilk, casein isolate or mixtures thereof.

As it will be apparent to the skilled person, milk-based ingredients according to the present invention may bring additional nutrients beyond proteins to the complementary nutritional composition, for example sugars, in particular reducing sugar such as lactose, and fats.

Within the context of the present invention, the term "fat" or "fat source" or "lipid" or "lipid source" or "fats" or "oil" or "oils" indicate an edible solid or liquid fat or mixtures thereof. Not limiting categories of fats are those from animal, fish or vegetable origins. Non limiting examples of fats which could be used according to the present invention are: fish oil, cocoa butter, cocoa butter equivalents (CBE), cocoa butter substitutes (CBS), vegetable oils (for example rapeseed oil, palm oil, corn oil, soy oil, corn oil, coconut oil and/or sunflower oil), milk fat, butter fat, and butter oils amongst others.

Within the context of the present invention, the term "bulking agent" identifies an ingredient which increases food volume or weight, for example increases total solid content. Non limiting examples of bulking agents are: sucrose, maltodextrines, enzymatically hydrolyzed cereal flour, cereal bran, soluble fibres like guar gum and psyllium husk, Carnuba Wax, Glycerin, Beta Glucan, Mannitol, Maltitol, Polydextrose, Methylcellulose, Pectin and mixtures thereof.

Within the context of the present invention the term "acidity regulator" indicates a substance which, when dissolved in a water based composition, is able to modulate the pH of such composition. Non limiting examples of acidity regulators are: mono-, di- and tri-sodium phosphate, mono-, di- and tri-potassium phosphate, magnesium phosphate, sodium carbonate, sodium bicarbonate, potassium carbonate, potassium bicarbonate, sodium hydroxide, potassium hydroxide, pyrophosphate salts and mixtures thereof.

Within the context of the present invention, the expressions "sugar" or "sugars" within the context of the present invention comprises available monosaccharides (e.g. galactose, fructose, glucose) available disaccharides (e.g. sucrose, lactose, maltose) or mixtures thereof.

Within the context of the present invention, the term "reducing sugar" identifies any sugar that is capable of acting as a reducing agent because it has a free aldehyde group or a free ketone group or is capable of forming it in solution through isomerisation. Non limiting examples of reducing sugars are: fructose, glucose, xylose, tagatose, rhamnose, maltose, lactose, fucose, arabinose, galactose or mixtures thereof.

As it will be apparent to the person skilled in the art, the total amount of sugar or reducing sugar in the heat treated cereal based composition according to the present invention may be provided by different ingredients present in the recipe. For example sugar and/or reducing sugars may be comprised in or provided by the dairy ingredient, the bulking agent, the cereal base ingredient or may be added as pure ingredients to the composition Within the context of the present invention, the term "caramel ingredient" identifies an artificial ingredient which may be added to food products to increase certain flavour notes and colour. The caramel ingredient is typically prepared by melting sugar or by heating sugar syrup at temperature between 110-180° C. optionally in the presence of acidic and/or alkaline catalysts.

Within the context of the present invention, the term "pre-reacted fraction" identifies the pre-reacted (heated) portion of ingredients comprising water, bulking agent, dairy ingredient, reducing sugar and fat which is obtainable from step b) of the process of the invention and which may be reintroduced in the cereal-based food preparation in step c) of the process of the invention before subjecting it to heat treatment to get the heat treated cereal based food product.

In the context of the present invention, where amounts of certain ingredients (such as, for example, sugars, fats, etc.), are indicated which may result from different constituents incorporated in the recipe then such amounts will reflect the total content of that ingredient in the composition, irrespective of the component it is derived from.

Within the context of the present invention the terms "flavour" and "flavours" identify the aroma (volatile compounds) and the taste (non-volatile compounds) which are comprised in a food product. Such flavour can be detected or assessed by different means, including for example sensory and analytical means. In one embodiment, the flavour generated according to the present invention is delivered by volatile compounds.

Within the context of the present invention the term "flavour precursors" identifies species or ingredients comprising them which are capable of producing flavour by breaking down (for example under caramelization process) or reacting with other components (for example in Maillard reaction) during thermal food processing. Such flavour precursors do not necessarily have flavouring properties themselves.

Within the context of the present invention the term "caramelization" will have the meaning usually assigned to it in the state of the art and it defines the thermal reaction of sugars per se, producing the characteristic caramel flavour and brown colour. Optionally, various ingredients (acidic and/or alkaline catalysts) can be used during the caramelization process in order to facilitate the sugar degradation and direct the process more towards aroma formation or towards brown pigment accumulation.

Within the context of the present invention, the term "Maillard reaction" and 'Maillard reactants/products' will have the meaning usually assigned to them in the state of the art and they define the complex series of chemical reactions between carbonyl and amino components derived from biological systems, present in food matrixes or in food additives (e.g. ammonium salts) and the associated reactants and products, respectively.

The term Maillard reaction is used herein in the established broad sense to refer to these reactions, and includes the closely associated reactions which are usually coupled with the Maillard reaction sensu stricto (such as Strecker degradation).

Embodiments of the Invention

It should be noted that embodiments and features described in the context of one of the aspects of the present invention may also apply to and be combined with other aspects and embodiments of the invention mutatis mutandis.

Heat Treated Cereal Based Food Product

In one embodiment, in the heat treated cereal-based food product of the present invention the ratio between concentrations of 2-acetyl-1-thiazole to 4-vinylguaiacol is equal or higher than 0.02, the ratio between concentrations of 2-acetyl-1-thiazoline to 4-vinylguaiacol is equal or higher than 0.02 and the ratio between concentrations of HDMF to 4-vinylguaiacol is equal or higher than 0.7.

In another embodiment, in the heat treated cereal-based food product of the present invention the ratio between concentrations of 2-acetyl-1-thiazole to 3-methylbutanal is equal or higher than 0.035, the ratio between concentrations of 2-acetyl-1-thiazoline to 3-methylbutanal is equal or higher than 0.04 and the ratio between concentrations of HDMF to 3-methylbutanal is equal or higher than 1.0.

In a further embodiment, in the heat treated cereal-based food product of the present invention the ratio between concentrations of 2-acetyl-1-thiazole to 4-vinylguaiacol is equal or higher than 0.02, the ratio between concentrations of 2-acetyl-1-thiazoline to 4-vinylguaiacol is equal or higher than 0.02 and the ratio between concentrations of HDMF to 4-vinylguaiacol is equal or higher than 0.7 and the ratio between concentrations of 2-acetyl-1-thiazole to 3-methylbutanal is equal or higher than 0.035, the ratio between concentrations of 2-acetyl-1-thiazoline to 3-methylbutanal is equal or higher than 0.04 and the ratio between concentrations of HDMF to 3-methylbutanal is equal or higher than 1.0.

In one embodiment, in the heat treated cereal-based food product of the present invention the ratio between concentrations of 2-acetyl-1-thiazole to 4-vinylguaiacol is equal or higher than 0.02, the ratio between concentrations of 2-acetyl-1-thiazoline to 4-vinylguaiacol is equal or higher than 0.02, the ratio between concentrations of HDMF to 4-vinylguaiacol is equal or higher than 0.7 and the ratio between concentrations of maltol to 4-vinylguaiacol is equal or higher than 7.

In another embodiment, in the heat treated cereal-based food product of the present invention the ratio between concentrations of 2-acetyl-1-thiazole to 3-methylbutanal is equal or higher than 0.035, the ratio between concentrations of 2-acetyl-1-thiazoline to 3-methylbutanal is equal or higher than 0.04, the ratio between concentrations of HDMF to 3-methylbutanal is equal or higher than 1.0 and the ratio between concentrations of maltol to 3-methylbutanal is equal or higher than 8.

In a further embodiment, in the heat treated cereal-based food product of the present invention the ratio between concentrations of 2-acetyl-1-thiazole to 4-vinylguaiacol is equal or higher than 0.02, the ratio between concentrations of 2-acetyl-1-thiazoline to 4-vinylguaiacol is equal or higher than 0.02, the ratio between concentrations of HDMF to 4-vinylguaiacol is equal or higher than 0.7 and the ratio between concentrations of maltol to 4-vinylguaiacol is equal or higher than 7 and the ratio between concentrations of 2-acetyl-1-thiazole to 3-methylbutanal is equal or higher than 0.035, the ratio between concentrations of 2-acetyl-1-thiazoline to 3-methylbutanal is equal or higher than 0.04, the ratio between concentrations of HDMF to 3-methylbutanal is equal or higher than 1.0 and the ratio between concentrations of maltol to 3-methylbutanal is equal or higher than 8.

In one embodiment, the heat treated cereal-based food product of the present invention comprises cereal-based ingredient, bulking agent, reducing sugar, dairy protein, and fat and is characterized by having a ratio between concentrations of 2-acetyl-1-thiazole to 4-vinylguaiacol equal or higher than 0.02 and of ratio of 2-acetyl-1-thiazoline to 4-vinylguaiacol equal or higher than 0.02 and/or by having a ratio between concentrations of 2-acetyl-1-thiazole to 3-methylbutanal equal or higher than 0.035 and a ratio between concentrations of 2-acetyl-1-thiazoline to 3-methylbutanal equal or higher than 0.04.

In one embodiment of the present invention, the ratio between concentrations of 2-acetyl-1-thiazole to 4-vinylguaiacol is equal or higher than 0.03, for example equal or higher than 0.05. In one embodiment of the present invention, the ratio of 2-acetyl-1-thiazoline to 4-vinylguaiacol is equal or higher than 0.03, for example equal or higher than 0.05.

In one embodiment of the present invention, the ratio between concentrations of HDMF to 4-vinylguaiacol is equal or higher than 1.0, for example equal or higher than 2.0.

In one embodiment of the present invention, the ratio between concentration of 2-acetyl-1-thiazole to 3-methylbutanal is equal or higher than 0.035, for example equal or higher than 0.08, for example equal or higher than 0.10.

In one embodiment of the present invention, the ratio of 2-acetyl-1-thiazoline to 3-methylbutanal is equal or higher than 0.04, for equal or higher than example 0.05.

In one embodiment of the present invention, the ratio between concentrations of HDMF to 3-methylbutanal is equal or higher than 8.0 for example equal or higher than 10.

In one embodiment, the heat treated cereal-based product above defined comprises cereal based ingredient in an amount comprised between 30 and 80% dry w/w, for example between 40 and 70% dry w/w.

In one embodiment, the heat treated cereal-based food product above described comprises cereal flour as cereal-based ingredient in an amount comprised between 30 and 80% dry w/w, for example between 35 and 75% dry w/w, for example between 40 and dry 70% w/w.

In one embodiment, the heat treated cereal-based food product above described comprises a bulking agent in an amount comprised between 5 and 50% dry w/w, for example between 5 and 30% dry w/w, for example between 7 and 20% dry w/w.

In one embodiment, the heat treated cereal-based food product above described comprises sucrose as bulking agent in an amount comprised between 5 and 50% dry w/w, for example between 5 and 30% dry w/w, for example between 7 and 20% dry w/w.

In one embodiment, the heat treated cereal-based food product above described comprises a dairy ingredient in an amount comprised between 5 and 25% dry w/w, for example between 5 and 15% dry w/w.

In one embodiment, the heat treated cereal-based food product above described comprises skimmed milk powder as dairy ingredient in an amount comprised between 5 and 25% dry w/w, for example between 5 and 15% dry w/w.

In one embodiment, the heat treated cereal-based food product above described comprises fat in an amount comprised between 5 and 20% dry w/w, for example between 5 and 15% dry w/w.

In one embodiment, the heat treated cereal-based food product of the invention may comprise additional ingredients, such as for example acidity regulators, sugars, vitamins and minerals, honey, fruits and vegetables, malt extract and the like.

In one embodiment, the heat treated cereal based food product according to the present invention is a cereal product designated for infants, kids or adults, for example breakfast cereal and/or infant cereal product. In a further embodiment, the heat treated cereal based food product according to the present invention is an infant cereal product.

In one embodiment, the heat treated cereal based product of the invention comprises a cereal ingredient which is derived from wheat, rice, oat, corn, rye, barley, for example wheat flour.

In one embodiment, the ingredients used to prepare the heat treated cereal based product according to the present invention are not rich in 4-vinylguaiacol or in its precursors, for example ferulic acid. Non limiting examples of ingredients which are rich in 4-vinylguaiacol or in its precursors are: buckwheat, brans etc.

In another embodiment, the heat treated cereal-based product according to the present invention product doesn't contain any added caramel ingredient.

Process for the Preparation of Heat Treated Cereal-Based Food Product

In one embodiment of the present invention, the process for the preparation of the heat treated cereal based food product, the cereal-based food product comprising cereal-based ingredient, a bulking agent, reducing sugar, dairy protein, and fat, the process comprising the steps of (i) providing ingredients comprising cereal-based ingredient, a bulking agent, reducing sugar, dairy protein, fat and water (ii) combining the provided ingredients to form a cereal-based food preparation, (iii) subjecting the cereal-based food preparation to heat treatment and (iv) drying the cereal-based food product obtainable from step (iii), wherein said process is characterized in that it comprises the steps of:
 a) Separating a portion of ingredients comprising water, bulking agent, dairy ingredient, reducing sugar and fat and forming a wet mixture thereof;
 b) subjecting the wet mixture to a heat treatment at a temperature comprised between 100 and 150° C., for example 110 and 140° C., under a pressure comprised between 2 and 7 bars, for example between 3 and 6 bars, for a time comprised between 5 and 20 min to produce a pre-reacted fraction, and then
 c) combining the pre-reacted fraction with the remainder of ingredients to form a cereal based food preparation, whereby the pre-reacted fraction is re-incorporated in an amount comprised between 3 and 30 dry weight % of the cereal based food preparation, for example between 5 and 20 dry weight % of the cereal based food preparation;
wherein step (iii) and (iv) are carried out simultaneously, for example via roller drying treatment.

The process according to the invention generates higher concentration of certain flavours in the heat treated cereal based product than those generated in a corresponding traditional process where a portion of the ingredients is not pre-treated as it is in the present invention.

In one embodiment, the process of the present invention increases the presence of 2-acetyl-1-thiazole.

In one embodiment, the process of the present invention increases the presence of 2-acetyl-1 thiazoline.

In another embodiment, the process of the present invention increases the presence of 2-acetyl-1 thiazoline and 2-acetyl-1-thiazole.

In a further embodiment, the process of the present invention increases the presence of 2-acetyl-1 thiazoline, 2-acetyl-1-thiazole and HDMF.

In a still further embodiment, the process of the present invention increases the presence of 2-acetyl-1 thiazoline, 2-acetyl-1-thiazole, HDMF and maltol.

In an additional embodiment, the process of the present invention increases the presence of 2-acetyl-1 thiazoline, 2-acetyl-1-thiazole, HDMF, 2,3-butanedione and maltol.

Due to their characteristic flavour notes below described, the increased presence of the above mentioned flavours contributes to provide the desired increased toasty/biscuit/caramel notes to the heat treated cereal based products according to the invention:

| Odorant | Odour quality |
| --- | --- |
| 2-acetyl-1-thiazole | roasty, popcorn-like |
| HDMF | caramel |
| 2-acetyl-1-thiazoline | roasty, popcorn-like |
| maltol | caramel |

In one embodiment, the process of the present invention generates in the resulting heat treated cereal-based food product a ratio between concentrations of 2-acetyl-1-thiazole to 4-vinylguaiacol equal or higher than 0.02 and/or a ratio between concentrations of 2-acetyl-1-thiazole to 3-methylbutanal equal or higher than 0.035.

In one embodiment, the process of the present invention generates in the resulting heat treated cereal-based food product a ratio between concentrations of ratio of 2-acetyl-1-thiazoline to 4-vinylguaiacol equal or higher than 0.02 and/or a ratio between concentrations of ratio of 2-acetyl-1-thiazoline to 3-methylbutanal equal or higher than 0.04.

In one embodiment, the process of the present invention generates in the resulting heat treated cereal-based food product a ratio between concentrations of HDMF to 4-vinylguaiacol equal or higher than 0.7 and/or a ratio between concentrations of HDMF to 3-methylbutanal equal or higher than 1.0.

In one embodiment, the process of the present invention generates in the resulting heat treated cereal-based food product a ratio between concentrations of maltol to 4-vinylguaiacol which is equal or higher than 7.0 and/or a ratio between concentrations of maltol to 3-methylbutanal which is equal or higher than 8.0.

In another embodiment, the process of the present invention generates in the resulting heat treated cereal-based food product a ratio between concentrations of 2-acetyl-1-thiazole to 4-vinylguaiacol equal or higher than 0.02 and/or a ratio between concentrations of 2-acetyl-1-thiazole to 3-methylbutanal equal or higher than 0.035; a ratio between concentrations of 2-acetyl-1-thiazoline to 4-vinylguaiacol equal or higher than 0.02 and/or a ratio of ratio between concentrations of 2-acetyl-1-thiazoline to 3-methylbutanal equal or higher than 0.04; a ratio between concentrations of HDMF to 4-vinylguaiacol equal or higher than 0.7 and/or a ratio between concentrations of HDMF to 3-methylbutanal equal or higher than 1.0; and a ratio between concentrations of maltol to 4-vinylguaiacol which is equal or higher than 7.0 and/or a ratio between concentrations of maltol to 3-methylbutanal which is equal or higher than 8.0.

In one embodiment, the process according to the present invention product doesn't contemplate any caramel ingredient addition.

The process according to the invention comprises a drying step iv) and optionally milling in order to produce a dried product which may be reconstituted before use.

Drying is defined as the application of heat under controlled conditions, to remove the water present in liquid or semi-liquid foods and to yield solid products.

In one embodiment such step iii) and iv) are carried out simultaneously in a roller dryer.

The principle of roller drying process (or drum drying) is that a thin film of material is applied to the smooth surface of a continuously rotating, steam heated metal drum. The film of the drying material is continuously scraped off by a stationary knife located opposite to the point of application of the liquid or semi-liquid material. The dryer consists of a single drum or a pair of drums with or without satellite rollers.

Roller drying is a conventional drying technique in the art. The person skilled in the art will be able to select appropriate roller drying temperature and speed for the preparation of food products according to the method of the invention.

In some embodiment of the process of the present invention, the heat treated cereal based product obtained from drying step iv), or subsequent optional milling step, may be subject to a further dry mixing step whereby additional ingredient in powder form are mixed with the heat treated cereal based product. Non limiting examples of such ingredient may be: sugar, milk powder and the like, or mixtures thereof.

Process for the Preparation of a Pre-Reacted Fraction

In one embodiment, in step a) of the process of preparation of a pre-reacted fraction of ingredients as above and below described, an acidity regulator is also provided.

In one embodiment, in step a) of the process of preparation of a pre-reacted fraction of ingredients as above and below described, an acidity regulator is also provided to modulate the pH of the wet mixture to be comprised between 6 and 8, for example between 6 and 7.

In one embodiment, when the dairy ingredient provided in step a) of the process is milk powder or skimmed milk powder, an acidity regulator is also provided.

In another embodiment, when the dairy ingredient provided in step a) of the process is whey protein or buttermilk, an acidity regulator is not provided.

In one embodiment of the present invention, a process for the preparation of a pre-reacted fraction is provided which comprises:
(a) providing water, bulking agent in an amount comprised between 40 and 70% dry w/w, dairy ingredient, reducing sugar and fat and forming a wet mixture thereof having total solid contents comprised between 65 and 90% at a temperature comprised between 60 and 80° C.;
(b) subjecting the wet mixture to a heat treatment at a temperature comprised between 100 and 150° C., for example 110 and 140° C., under a pressure comprised between 2 and 7 bars, for example between 3 and 6 bars, for a time comprised between 5 and 20 min to produce a pre-reacted fraction.

In one embodiment of the present invention, a process for the preparation of a pre-reacted fraction is provided which comprises:
(a) providing water, bulking agent in an amount comprised between 40 and 70% dry w/w, dairy ingredient, reducing sugar, acidity regulator and fat and forming a wet mixture thereof having total solid contents comprised between 65 and 90% at a temperature comprised between 60 and 80° C.;
(b) subjecting the wet mixture to a heat treatment at a temperature comprised between 100 and 150° C., for example 110 and 140° C., under a pressure comprised between 2 and 7 bars, for example between 3 and 6 bars, for a time comprised between 5 and 20 min to produce a pre-reacted fraction.

In one embodiment of the present invention, a process for the preparation of a pre-reacted fraction is provided which comprises:
(a) providing water, bulking agent in an amount comprised between 40 and 70% dry w/w, dairy ingredient, reducing sugar and fat and forming a wet mixture thereof having total solid contents comprised between 65 and 90% at a temperature comprised between 60 and 80° C.; and pumping the wet mixture obtainable from step (a) at a temperature comprised between 40 and 80° C. into the equipment where step (b) is performed;
(b) subjecting the wet mixture to a heat treatment at a temperature comprised between 100 and 150° C., for example 110 and 140° C., under a pressure comprised between 2 and 7 bars, for example 3 and 6 bars, for a time comprised between 5 and 20 min to produce a pre-reacted fraction.

In another embodiment of the present invention, a process for the preparation of a pre-reacted fraction is provided which comprises:
(a) providing water, bulking agent, dairy ingredient in an amount comprised between 5 and 20% dry w/w, reducing sugar and fat and forming a wet mixture thereof having total solid contents comprised between 65 and 90% at a temperature comprised between 60 and 80° C.;
(b) subjecting the wet mixture to a heat treatment at a temperature comprised between 100 and 150° C., for example between 110 and 140° C., under a pressure ranging from 2 to 7 bars, for example from 3 to 6 bars, for a time comprised between 5 and 20 min to produce a pre-reacted fraction.

In a further embodiment of the present invention, a process for the preparation of a pre-reacted fraction is provided which comprises:
(a) providing water, bulking agent, dairy ingredient, reducing sugar and fat in an amount comprised between 10 and 25% dry w/w and forming a wet mixture thereof having total solid contents comprised between 65 and 90% at a temperature comprised between 60 and 80° C.;

(b) subjecting the wet mixture to a heat treatment at a temperature comprised between 100 and 150° C., for example between 110 and 140° C., under a pressure comprised between 2 and 7 bars, for example 3 and 6 bars, for a time comprised between 5 and 20 min to produce a pre-reacted fraction.

In still further embodiment of the present invention, a process for the preparation of a pre-reacted fraction is provided which comprises:
(a) providing water in an amount ranging from 10 to 25% w/w of the wet mixture, bulking agent, dairy ingredient, reducing sugar and fat composition and forming a wet mixture thereof having total solid contents comprised between 65 and 90% at a temperature comprised between 60 and 80° C.;
(b) subjecting the wet mixture to a heat treatment at a temperature comprised between 100 and 150° C., for example between 110 and 140° C., under a pressure comprised between 2 and 7 bars, for example 3 and 6 bars, for a time comprised between 5 and 20 min to produce a pre-reacted fraction.

In one embodiment of the present invention, a process for the preparation of a pre-reacted fraction is provided which comprises:
(a) providing water, bulking agent, dairy ingredient, reducing sugar and fat and forming a wet mixture thereof having total solid contents comprised between 65 and 90% at a temperature comprised between 60 and 80° C. and having a pH comprised between 6 and 8, for example between 6 and 7;
(b) subjecting the wet mixture to a heat treatment at a temperature comprised between 100 and 150° C., for example between 110 and 140° C., under a pressure comprised between 2 and 7 bars, for example 3 and 6 bars, for a time comprised between 5 and 20 min to produce a pre-reacted fraction.

In a further embodiment of the present invention, a process for the preparation of a pre-reacted fraction is provided which comprises:
(a) providing water, bulking agent, dairy ingredient, reducing sugar and fat and forming a wet mixture thereof having total solid contents comprised between 65 and 90% at a temperature comprised between 60 and 80° C.;
(b) subjecting the wet mixture to a heat treatment at a temperature comprised between 100 and 150° C., for example between 110 and 140° C., under a pressure comprised between 2 and 7 bars, for example 3 and 6 bars, for a time comprised between 5 and 20 min to produce a pre-reacted fraction and then cooled at a temperature comprised between 50 and 80° C., for example 60 and 75° C.

In another embodiment of the present invention, a process for the preparation of a pre-reacted fraction is provided which comprises:
(a) providing water, bulking agent, dairy ingredient, reducing sugar and fat and forming a wet mixture thereof having total solid contents comprised between 65 and 90% at a temperature comprised between 60 and 80° C. and having a pH comprised between 6 and 8, for example between 6 and 7;
(b) subjecting the wet mixture to a heat treatment at a temperature comprised between 100 and 150° C., for example between 110 and 140° C., under a pressure comprised between 2 and 7 bars, for example 3 and 6 bars, for a time comprised between 5 and 20 min then cooled at a temperature comprised between 50 and 80° C., for example 60 and 75° C., to produce a pre-reacted fraction.

In one embodiment, a process for the preparation of a pre-reacted fraction is provided which comprises:
(a) providing water in an amount comprised between 10 and 25% w/w of the wet mixture, bulking agent in an amount comprised between 40 and 70% dry w/w, dairy ingredient in an amount comprised between 5 and 25% dry w/w, reducing sugar and fat in an amount comprised between 10 and 25% dry w/w and forming a wet mixture thereof having total solid contents comprised between 65 and 90% at a temperature comprised between 60 and 80° C. and having a pH comprised between 6 and 7;
(b) subjecting the wet mixture to a heat treatment at a temperature comprised between 100 and 150° C., for example between 110 and 140° C., under a pressure ranging from 2 to 7 bars, for example from 3 to 6 bars, for a time comprised between 5 and 20 min and then cooled at a temperature comprised between 50 and 80° C., for example 60 and 75° C., to produce a pre-reacted fraction.

In one embodiment, a process for the preparation of a pre-reacted fraction enriched in flavor precursors is provided which comprises:
(a) providing water in an amount comprised between 10 and 25% dry w/w, bulking agent in an amount comprised between 40 and 70% dry w/w, dairy ingredient in an amount comprised between 5 and 25 dry, reducing sugar, fat in an amount comprised between 10 and 25% dry w/w and an acidity regulator and forming a wet mixture thereof having total solid contents comprised between 65 and 90% at a temperature comprised between 60 and 80° C. and having a pH comprised between 6 and 8, for example between 6 and 7;
(b) subjecting the wet mixture to a heat treatment at a temperature comprised between 100 and 150° C., for example between 110 and 140° C., under a pressure ranging from 2 to 7 bars, for example from 3 to 6 bars, for a time comprised between 5 and 20 min and then cooled at a temperature comprised between 50 and 80° C., for example 60 and 75° C., to produce a pre-reacted fraction.

In one embodiment, the wet mixture formed in step a) comprises at least 5% dry w/w of reducing sugar, for example lactose or glucose or mixtures thereof.

In one embodiment, the pre-reacted fraction according to the present invention is enriched in flavour precursors.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

EXPERIMENTAL SECTION

Analytical Methodology

Following analytical methods were applied in analysis of samples described further in the examples.

Sensory Analysis 27.3 g of cereal roller-dried product was reconstituted in 100 mL milk (2.5% fat) at 50° C. and sensory evaluation was performed by trained sensory panel composed of 12 assessors.

Monadic sensory profile (28 attributes) was conducted on appearance, texture, flavour and aroma.

Analysis of Aroma Compounds

Content of fifteen aroma compounds in cereal products was determined using Head Space Solid Phase Micro Extraction in combination with Gas Chromatography and tandem Mass Spectrometry (HS-SPME-GC/MS/MS). Quantification was accomplished by Stable Isotope Dilution Analysis (SIDA).

The heat treated cereal-based product sample (1 g±0.002 g) was weighed into a 20 mL headspace vial. Ultrapure water (10 mL) and methanol solution of internal standards (20 µL) were added together with a magnetic stir bar. The vial was closed with a screw cap and the mixture was homogenized by means of a vortex agitator for 5 s and afterwards stirred for 15 minutes using a magnetic stirrer. The mixture was then centrifuged at 4000 rpm for 3 minutes and an aliquot of supernatant (5 mL) was transferred into a new 20 mL headspace vial and analysed by HS-SPME-GC/MS/MS. Each sample was prepared in duplicates by two independent work-ups.

For HS-SPME, the incubation (5 min) and extraction (30 min) were performed at 70° C. DVB-CAR-PDMS fiber of 2 cm (Supelco) was used for the extraction under agitator speed of 500 rpm. The fiber was injected into a GC-MS/MS instrument and aroma compounds were desorbed in split mode (ratio 5:1) at 250° C. for 5 min.

For GC/MS, an Agilent 7890A gas chromatograph and Agilent 7000 triple quadrupole mass spectrometer with high sensitivity electron ionization source (HS-EI) were used. Gas chromatographic separations were achieved on a DB-624-UI column 60 m×0.25 mm i.d., film thickness 1.4 µm (J&W Scientific). The temperature program of the oven started at 50° C.; the temperature raised by 5° C./min to 200° C. and then by 30° C./min to 250° C. and maintained constant for 10 min. Helium was used as a carrier gas with a constant flow of 1.0 mL/min.

Analysis of Colour

The colour of cereal products (powders) was assessed by measuring the CIE (Commission Internationale de l'Eclairage) colour space parameters (L*, a*, and b*) using a Colorflex CX1051 instrument (Hunterlab). This model encompasses the entire light spectrum, including colours outside human vision: the L* value indicates the level of light or dark, which ranges from 0 (black) to 100 (white), whereas parameters a* (from green to red) and b* (from blue to yellow) range from –300 to 300. A powdered sample was transferred into a glass cuvette up to about 2 cm height and the colour was measured in triplicate; the average value of three independent measurements was calculated.

Analysis of Acrylamide

The sample preparation method was adapted from the method published by Wenzl et al. (Wenzl, S. Szilagyi, J. Rosén & L. Karasek, 2009. Validation by collaborative trial of an isotope dilution liquid chromatographic tandem mass spectrometric method to determine the content of acrylamide in roasted coffee, Food Additives & Contaminants: Part A). Acrylamide was extracted from the cereal product with water. Non-polar interference were first eliminated with 2,2,4-Trimethylpentane. Other interferences were then removed with solid phase extraction on a Multimode® cartridge and then on an ENV+® cartridge. Final extract was concentrated and acrylamide was analysed by High Performance Liquid Chromatography coupled with tandem Mass Spectrometry (HPLC-MS/MS). The data were acquired in positive electrospray ionisation mode (ESI+), monitoring at least two fragmentation transitions for confirmatory purpose. A labelled isotopomer (2,3,3-[$2H_3$]-acrylamide) was added as an internal standard prior to the extraction step for accurate quantitation.

Analysis of Reactive and Blocked Lysine

Quantitative determination of reactive lysine (part of lysine present in proteins whose ε-amino group is free) and blocked lysine (part of lysine present in proteins as ε-deoxyfructosyllysine, ε-dfl) was based on the work of Bujard and Finot (1978) (Bujard E, Finot P A. 1978. Measure of available and blocked lysine in industrial milks. Ann Nutr Alim 32: 291-305). Test portion of cereal product was first hydrolysed in 6 mol/L hydrochloric acid, during which a defined part of blocked lysine was converted into furosine. Aliquot of the hydrolysate was evaporated and diluted in an appropriate buffer. Lysine and furosine were separated by cation exchange chromatography and detected photometrically (570 nm) after post-column reaction with ninhydrin. For lysine quantification, a one-point calibration was used. For the furosine quantification, a linear regression model with two standard concentrations (8 and 40 nmol/mL) ignoring the origin was used. Reactive and blocked lysine were calculated on the basis of the following considerations: during hydrolysis in 6 mol/L HCl about 40% of ε-dfl is retransformed into lysine, part is transformed into pyridosine and about 32% into furosine [Bujard and Finot (1978)]. Thus, amount of blocked lysine was calculated from measurement of furosine. The amount of reactive lysine was calculated by subtraction of amount of lysine formed from ε-dfl during acid hydrolysis from the total amount of lysine determined in the hydrolysate.

EXAMPLES

Reference Example 1: Preparation of Heat Treated Cereal Based Product by Roller Drying (Conventional Process)

A conventional process for preparation of roller-dried cereal product is described. Two cereal products were prepared having the compositions reported in Table 1. The ingredients were homogenized with water. The slurry underwent conventional hydrolysis process with amylase solution which was injected in-line just before the static mixer where steam was then injected to reach the optimum temperature for the enzyme hydrolytic activity and processed for a residence time of around one minute, before treatment with steam injection for hygienic reasons and enzymes inactivation. The slurry (comprising around 50% w/w solids) was then subjected to a roller drying to provide the finished food product. Roller-drying was performed on a single-cylinder roller dryer operating at temperature of 180 to 183° C. and roller speed of 4.5 rpm. The dried product with moisture content of about 2% to 3% was then milled to particle size of about 2 mm.

TABLE 1

| | % (dry matter) | |
|---|---|---|
| Ingredient | Formula A | Formula B |
| Wheat flour | 65.233 | 65.233 |
| Sucrose | 15.301 | 14.663 |
| Fat | 9.851 | 9.850 |
| Skimmed milk powder | 9.243 | 9.243 |
| Dextrose | | 0.639 |
| Acidity Regulator (Calcium carbonate, Dipotassium Phosphate) | 0.371 | 0.370 |
| Enzyme (alpha-amylase) | 0.001 | 0.001 |

Reference Example 2: Preparation of Heat Treated Cereal Based Product by Roller Drying (Process with Reduced Roller Speed)

Two cereal products were prepared as described in Example 1 while the roller speed during the roller-drying was reduced to 2.5 rpm (decrease by 44% as compared to speed applied during the production described in Example 1).

Example 3: Preparation of Heat Treated Cereal Based Product by Roller Driving (Process with Pre-Reaction of Portion of Ingredients Prior Drying)

In this example, the method of the invention is described. Two cereal products were prepared analogously as described in Example 1 while a portion of ingredients were pre-reacted prior the roller-drying. Two liquid formulas were prepared having the compositions reported in Table 2. Solid ingredients were mixed with water in the tank at 75° C. using a high shear mixer. Fat was then added under high shear mixing. The resulting soup was transferred to the reaction section where steam used in order to increase the temperature of the soup to 130° C. under a simultaneous increase of pressure to 5 bar. Such conditions were maintained for 12 min. Subsequently, pressure was released and the soup was rapidly cooled down below 75° C. Resulting mixture having total solid content between 72% and 79% was then re-incorporated into the main process described in Example 1 at dosage of 10% dry w/w of the overall cereal base recipe.

TABLE 2

| | % | |
|---|---|---|
| Ingredient | Formula A | Formula B |
| Sucrase | 45.608 | 42.624 |
| Fat | 23.558 | 23.558 |
| Water | 19.458 | 19.458 |
| Skimmed milk powder | 10.656 | 10.656 |
| Dextrose | | 2.984 |
| Dipotassium phosphate | 0.719 | 0.719 |

Example 4: Comparison of Aroma Content in Roller Dried Cereal Products

Content of selected aroma compounds was quantified in six cereal products produced as described in Examples 1-3.

Relative concentration of odorants present in the product containing pre-reacted fraction of ingredients as compared to product made by conventional approach without pre-reaction (set at 100%) is depicted in FIG. 1. It was evidenced that pre-reaction triggered significant increase of following odorants (mean of increase factor from two formulas shown in brackets): 2,3-butanedione (2.2), 2,3-pentanedione (1.7), 2-acetylthiazole (3.7), 4-hydroxy-2,5-dimethyl-3(2H)-furanone (HDMF, 4.1), 2-acetyl-1-thiazoline (3.0), and maltol (4.2). In addition, group of odorants called Strecker aldehydes comprising of 2- and 3-methylbutanal, methional and phenylacetaldehyde were increased by 50% when pre-reacted ingredients were used in cereal base recipe.

Figure 2:
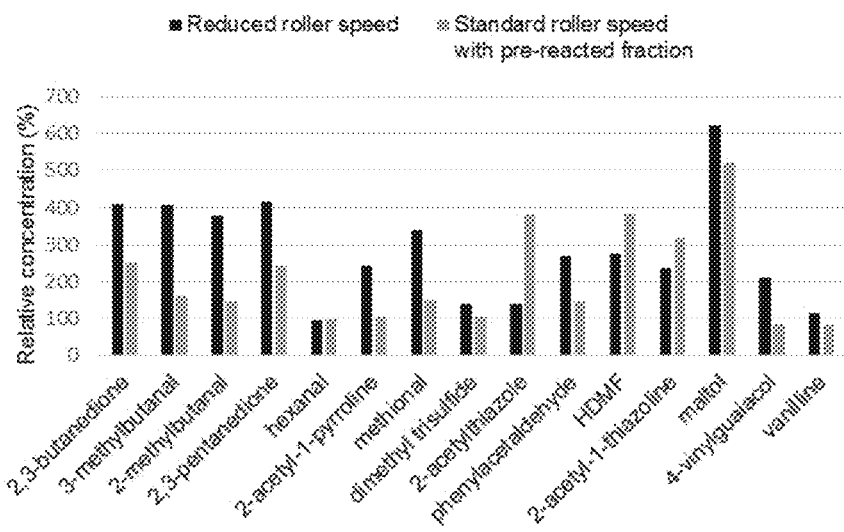
FIG. 2 is graphical representation of impact of reduced roller speed and impact of pre-reaction of ingredient fraction on aroma content in cereal product as described in Example 4.
Figure 2:
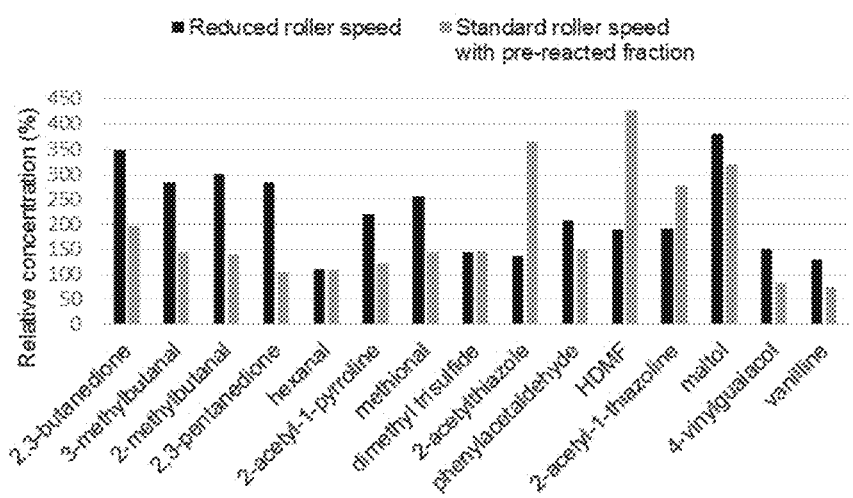

Impact of reduced roller speed and impact of pre-reaction of ingredient fraction on aroma content in cereal product is compared in FIG. 2. Concentrations of odorants determined in the product produced with lower roller speed (Example 2) and in the product produced with pre-reacted portion of ingredients (Example 3) were expressed relatively to concentrations of odorants in the product produced with roller speed defined herewith as standard (Example 1) and set as 100%.

It was evidenced that each manufacturing concept generates specific aroma profile (fingerprint) in the powder. For both Formulas A and B, reduction of roller speed from 4.5 to 2.5 rpm triggered significant increase of majority of odorants as compared to standard roller speed. On the other hand, method of invention based on pre-reaction of portion of ingredients increased certain odorants such as 2-acetylthiazole, 2-acetyl-1-thiazoline, HDMF and maltol more significantly than reduced roller speed while other odorants such as Strecker aldehydes were increased only slightly.

Example 5: Comparison of Aroma Content in Roller Dried Cereal Products (Ratios Between Selected Odorants)

It was already shown in Example 4 that manufacturing concept based on pre-reaction of portion of ingredients can create a specific aroma profile that is different from the profile achieved by reduction of roller speed.

Figure 3:
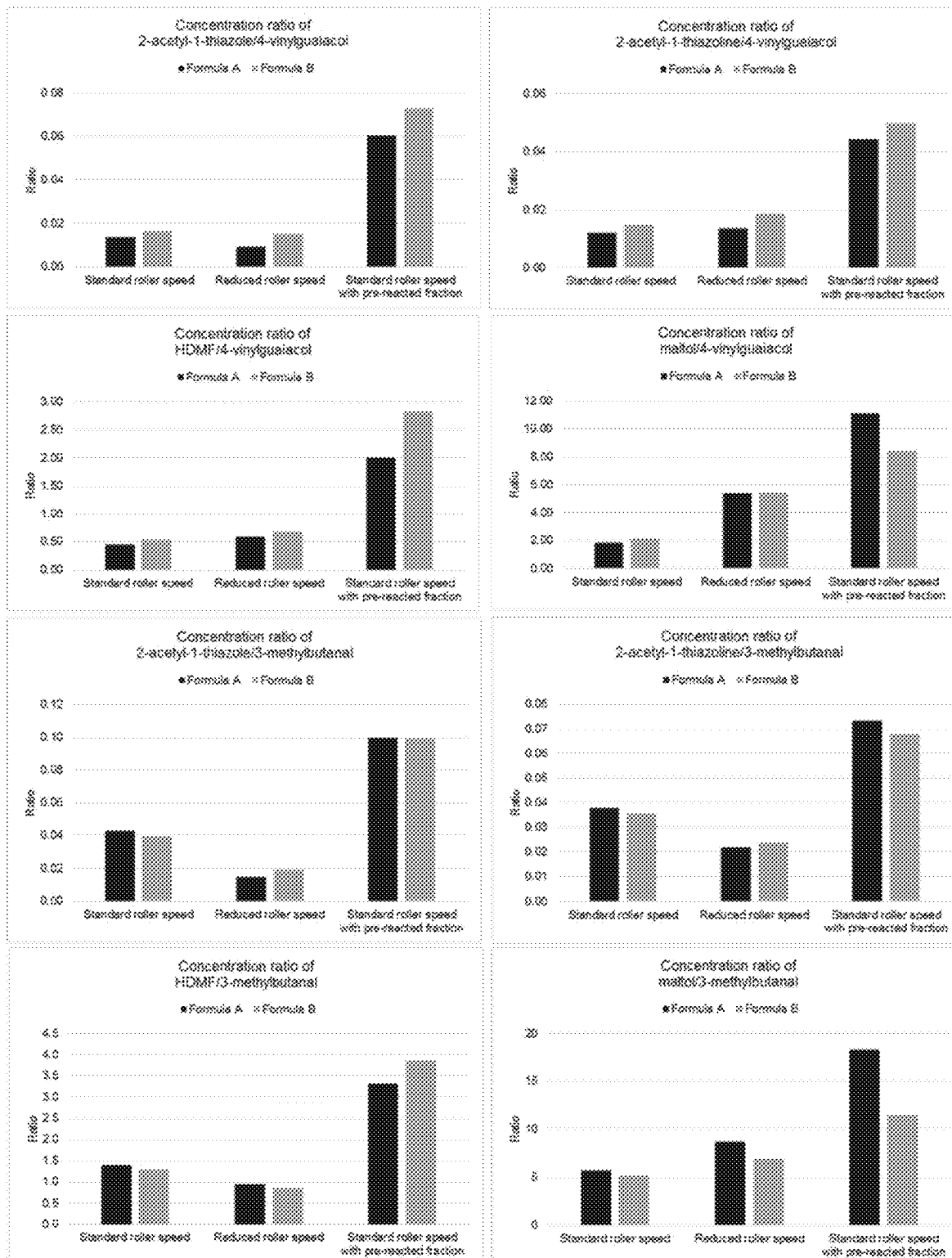
FIG. 3 is graphical representation of concentration ratios of 2-acetylthiazole (roasty), 2-acetyl-1-thiazoline (roasty) and 4-hydroxy-2,5-dimethyl-3(2H) furanone, also called HDMF, (caramel) to 4-vinylguaiacol (clove-like) and to 3-methylbutanal (malty, cheesy) in products prepared according to different manufacturing concepts as described in Example 5.

The aroma profile and consequently the flavour signature of the product is determined by ratios between the odorants. To demonstrate this phenomenon, concentration ratios of certain odorants were calculated and compared between different manufacturing concepts for both formulas A and B. Ratios of 2-acetylthiazole (roasty), 2-acetyl-1-thiazoline (roasty), HDMF (caramel), and maltol (caramel) to 4-vinylguaiacol (clove-like) and to 3-methylbutanal (malty, cheesy) were calculated and reported in FIG. 3. The results show that method of invention provides superior ratios of given odorants as compared to manufacturing concepts based on standard roller speed (conventional method) and reduced roller speed. Consequently the method of invention permits to generate unique flavour profile different to that generated by conventional method or by reduced speed.

Example 6: Sensory Evaluation of Heat Treated Cereal Based Products

Figure 4A:
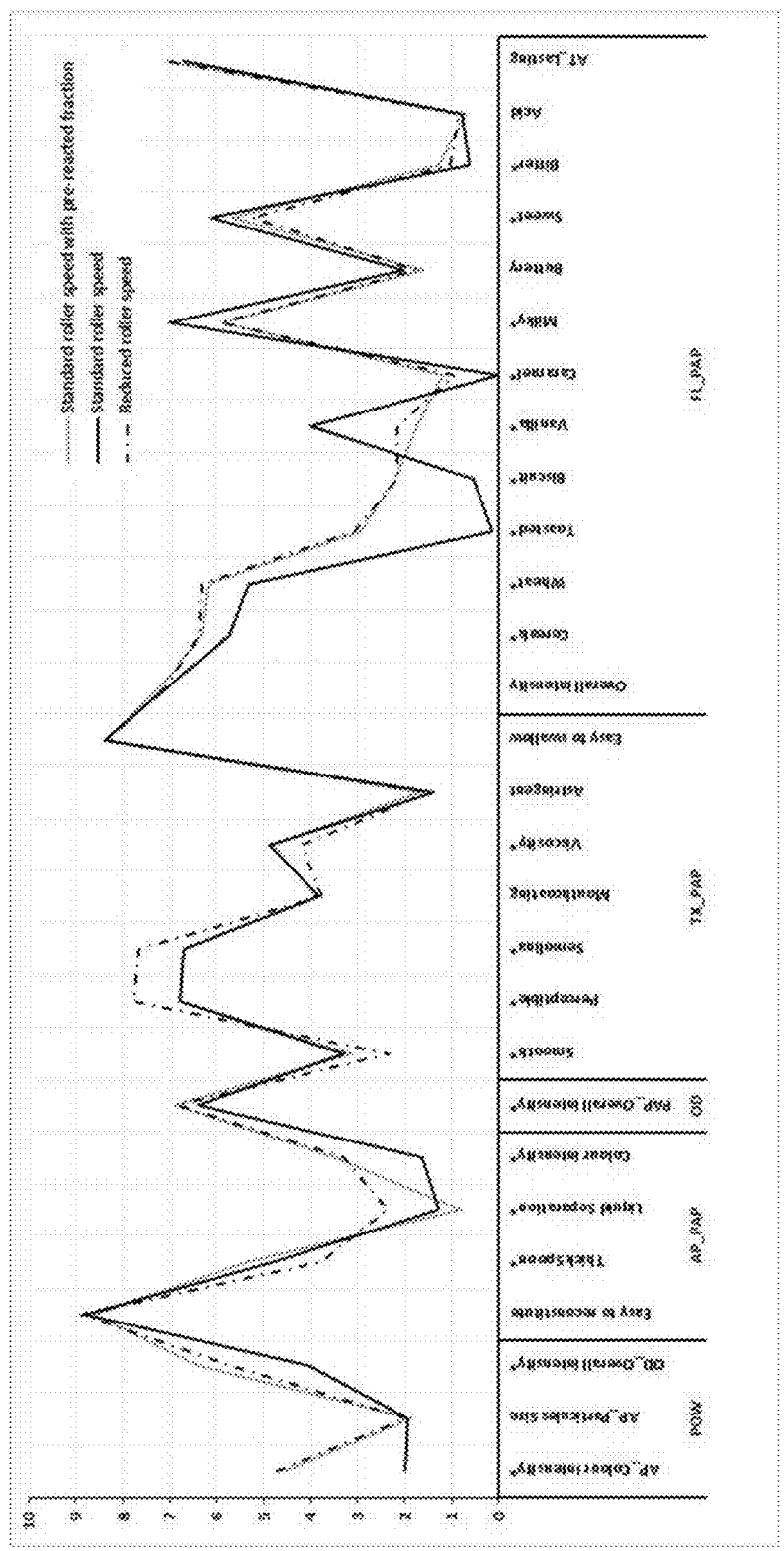
FIG. 4a relates to results for Formula A.
Figure 4B:
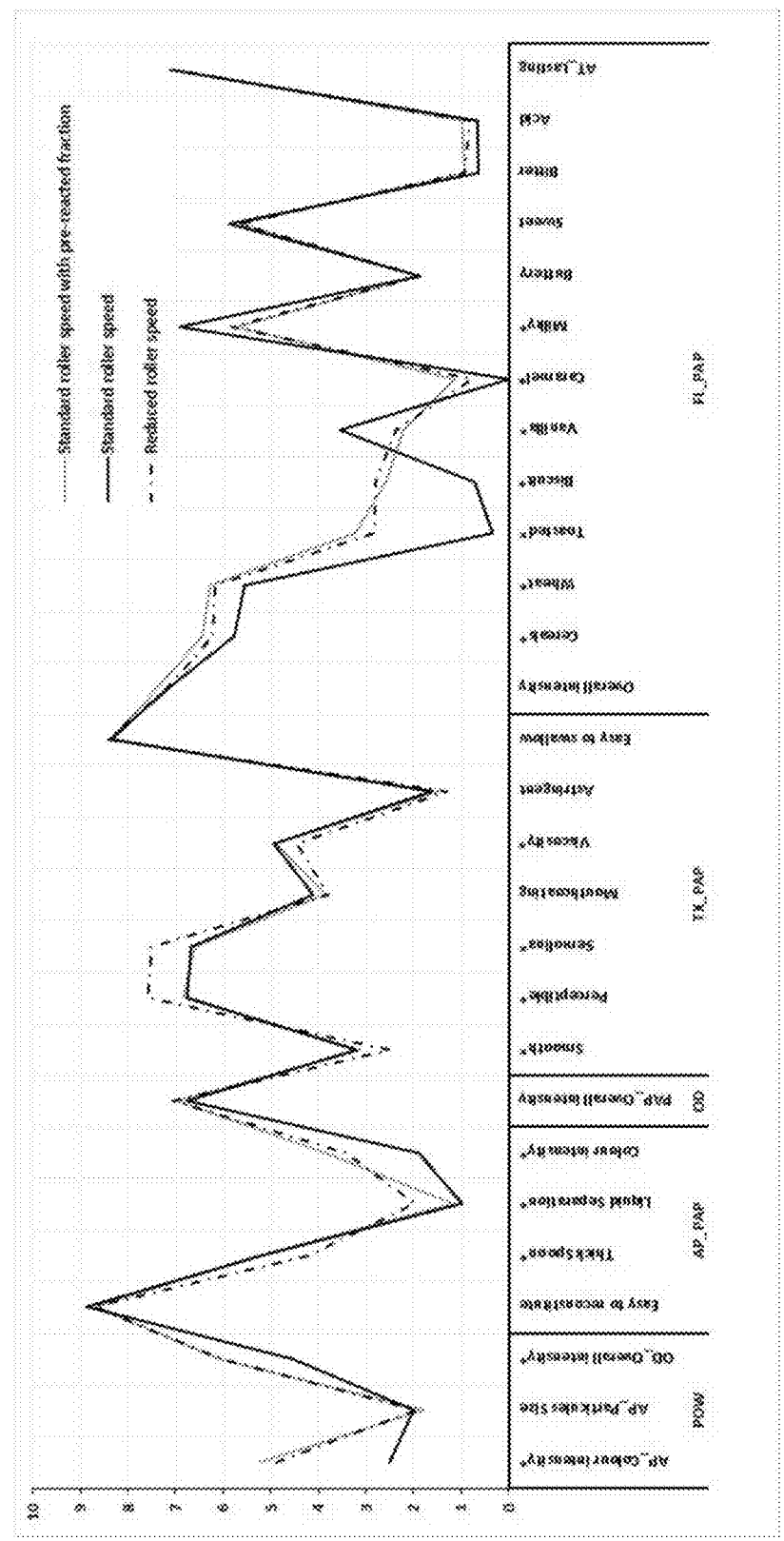
FIG. 4b relates to results for Formula B; abbreviations: POW-powder, AP_PAP-appearance pap, TX_PAP-texture pap, FL_PAP flavour pap).

Monadic sensory profile of cereal roller-dried products prepared as described in Examples 1-3 was evaluated in a pap after reconstitution of 27.3 g product in 100 ml milk (2.5% fat) at 50° C. The profiling was conducted on appearance, texture, flavour and aroma by trained sensory panel (12 assessors). Monadic sensory profiles of the products obtained for two formulas and three manufacturing concepts are depicted in FIG. 4. For both formulas, it was observed that method of invention based on pre-reaction of portion of ingredients (Example 3) increased toasted, biscuit, and caramel notes, decreased vanilla and milk notes and resulted in darker product as compared to product made by conventional concept (Example 1). Reduced roller speed (Example 2) enabled to reach similar intensity of sensory attributes for appearance and flavour as pre-reaction; however, it led to different texture, mainly to increased semolina perception.

Example 7: Colour Impact (Measurement of Colour Space Parameters of the Powders)

The colour of the powders prepared as described in Examples 1-3 was assessed by measuring the CIE (Commission Internationale de l'Eclairage) colour space parameters (L*, a*, and b*) using a Colorflex CX1051 instrument (Hunterlab).

Figure 5:
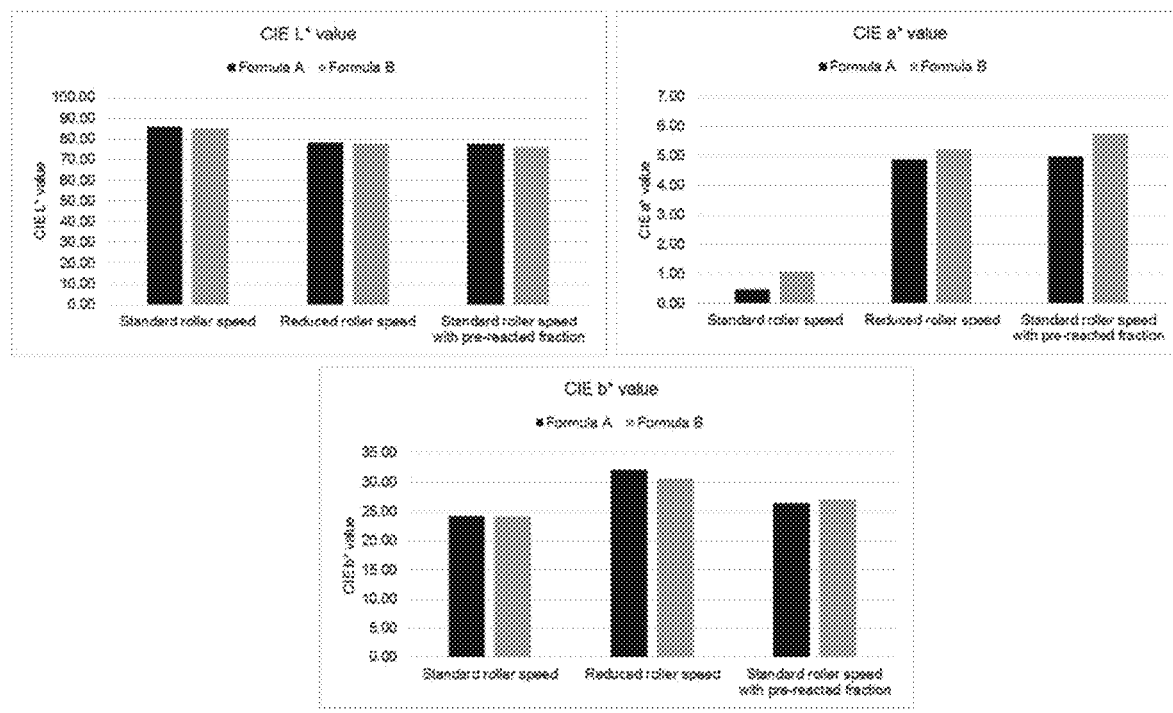
FIG. 5 depicts the individual space colour parameters a*, b*, and L* measured in the powders prepared in Examples 1-3 (as described in Example 7).

The individual space colour parameters a*, b*, and L* measured in the powders are depicted in FIG. 5. The colour measurement is well in accordance with visual evaluation by the panellists (Example 6) and substantiated the differences in colours. Use of pre-reacted portion of ingredients had similar impact on colour of powder as reduced roller speed resulting in a brownish colour shade. The colour of both variants is characterized by slightly reduced lightness (CIE L* value) and significantly increased green-red colour opponents (CIE a* value) as compared to the colour of the powder produced by conventional process having rather pale colour.

For products having biscuity and caramel flavour attributes, it has been shown that consumers prefer a brownish colour over pale colour. Reduction of roller speed could be a solution to obtain a desirable brownish colour, yet this approach reduces the throughput that is a significant drawback for factory production. Additionally, as shown in subsequent example 9, this approach also determines an increase in acrylamide content and lysine blockage that is to be avoided. This example demonstrated that method of invention enhances the colour or the roller-dried cereal product without affecting the throughput and enables to create darker (browner) product than obtained by conventional method.

Example 8: Impact on Acrylamide and Blocked Lysine

Figure 6:
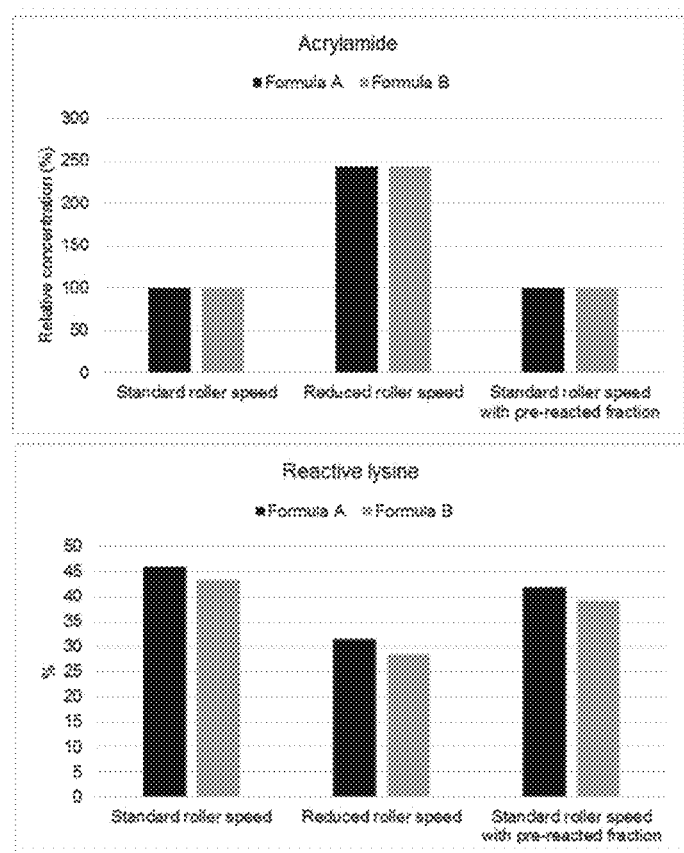
FIG. 6 reports relative contents of acrylamide and amount of reactive (nutritionally available) lysine, which were assessed in the powders prepared in Examples 1-3 (as described in Example 9).

Safety and nutritional aspects of three manufacturing concepts are evaluated in this example. Content of acrylamide, a heat-induced process contaminant, and amount of reactive (nutritionally available) lysine, were assessed in the powders prepared as described in Examples 1-3 and they are reported in FIG. 6.

Reduced roller speed led to increase of acrylamide by 2.4 folds as compared to conventional process. On the other hand, concept based on pre-reacting of portion of ingredients resulted in same acrylamide levels as detected for conventional process.

Amount of reactive (nutritionally available) lysine, part of lysine present in proteins whose ε-amino group is free, was the highest with the conventional process (average for both formulas was 45%). Process employing pre-reacted fraction of ingredients resulted in slight decrease of free lysine to 41% that represents 9% drop as compared to conventional process. More substantial decrease was detected with the process applying reduced roller speed which triggered decrease of free lysine to 35% that represents 33% drop as compared to conventional process.

This example corroborated that method of invention, contrarily to the concept based on reduced roller speed, enables to enhance the sensory properties without negative impact on nutritional and safety aspects of the product.

Example 9: Aroma Content in Recipe with Different Sugar Level

Four cereal products with different content of sugar were prepared according to Example 3.

Cereal products were produced with 10% (w/w, dry matter) of pre-reacted ingredients incorporated in the cereal based food preparation to be processed. Sugar in Formula B (Table 1) was replaced by wheat flour in order to achieve sugar reduction by 14%, 29% and 42%.

Content of selected aroma compounds was determined in four cereal products. Table 3 shows relative concentrations of odorants present in the products with reduced sugar levels expressed to the concentrations in the product with original sugar level set as 100% and prepared according to the method of the present invention. In this example, it was demonstrated that concentration of odorants decreases only marginally (up to 18%) with decreasing sugar level (increasing wheat flour level) in the recipe.

This experiment thus demonstrates that the manufacturing method of the invention may also be also used to reduce the sugar content of cereal-based product recipes without substantially decreasing the aroma compound content of the obtained heat treated cereal based product and accordingly without compromising the associated sensory properties.

TABLE 3

| Odorant | Sugar reduction | | | |
|---|---|---|---|---|
| | 0% | 14% | 29% | 42% |
| 2,3-butanedione | 100 | 103 | 83 | 92 |
| 3-methylbutanal | 100 | 97 | 76 | 82 |
| 2-methylbutanal | 100 | 100 | 82 | 90 |
| 2,3-pentanedione | 100 | 91 | 79 | 87 |
| hexanal | 100 | 85 | 82 | 79 |
| 2-acetyl-1-pyrroline | 100 | 99 | 73 | 77 |
| methional | 100 | 98 | 76 | 86 |
| dimethyltrisulfide | 100 | 72 | 92 | 95 |
| 2-acetyl-1-thiazole | 100 | 101 | 97 | 99 |
| phenylacetaldehyde | 100 | 98 | 80 | 88 |
| HDMF | 100 | 92 | 79 | 85 |
| maltol | 100 | 92 | 102 | 97 |
| 4-vinylguaiacol | 100 | 99 | 100 | 101 |
| vanillin | 100 | 94 | 87 | 106 |

Ratios of selected odorants obtained for the most extreme sugar reduction (42%) are depicted in Table 4. In the light of the limited change in levels of aroma compounds compared to the product comprising 100% amount of sugar as shown in Table 3, this experiment also demonstrates that the method of the invention provides enhancement in the generation of certain aroma compounds irrespective of the decrease in the sugar content of the recipe.

TABLE 4

| Odorant ratio | Ratio |
|---|---|
| 2-acetyl-1-thiazole/4-vinylguaiacol | 0.92 |
| HDMF/4-vinylguaiacol | 27.43 |
| maltol/4-vinylguaiacol | 238.54 |
| 2-acetyl-1-thiazole/3-methylbutanal | 0.18 |
| HDMF/3-methylbutanal | 5.24 |
| maltol/3-methylbutanal | 45.53 |

Example 10: Comparison of Product Made by Method of Invention with Commercial Products (Based on Levels 2-Acetyl-1-Thiazole and 2-Acetyl-1-Thiazoline)

Figure 7:
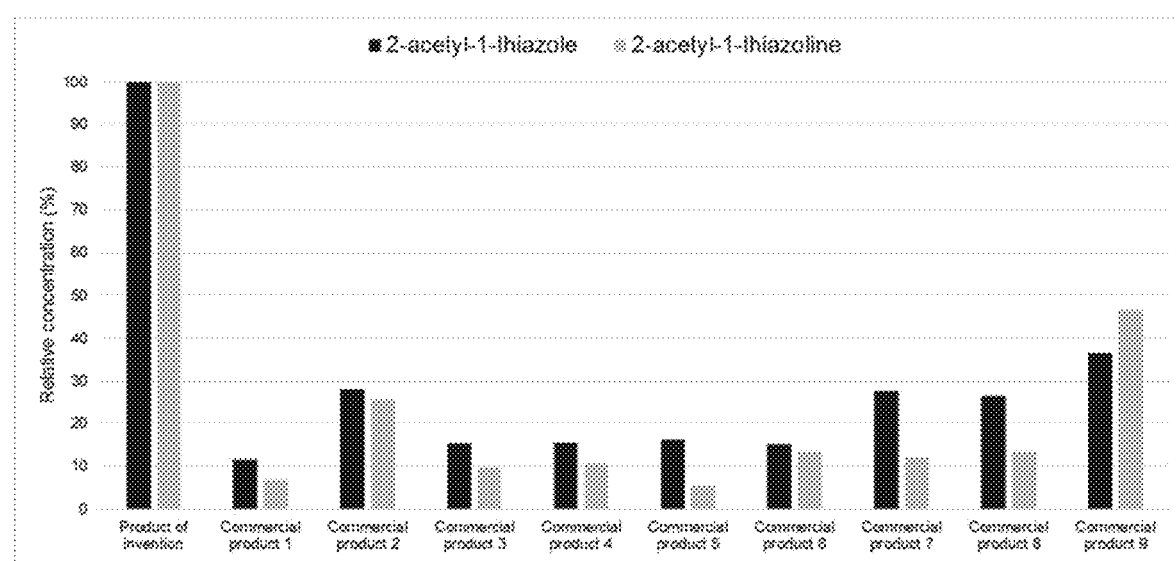
FIG. 7 depicts relative concentration (%) of 2-acetyl-1-thiazole and 2-acetyl-1-thiazoline in commercial products expressed to the concentration determined in the product of invention (Example 3, Formula B) set as 100%.

Levels of two odorants, 2-acetyl-1-thiazole and 2-acetyl-1-thiazoline, was compared in the product produced by the method of invention according to Example 3 and Formula B and in nine selected cereal products available commercially. It was found out that product produced by the method of invention employing pre-reacted fraction of ingredients has superior levels of 2-acetyl-1-thiazole and 2-acetyl-1-thiazoline than nine commercial products involved in the survey. Results are reported in FIG. 7 that depicts relative concentration (%) of 2-acetyl-1-thiazole and 2-acetyl-1-thiazoline in commercial products expressed to the concentration determined in the product of invention (Example 3, Formula B) set as 100%.

Example 11: Comparison of Product Made by Method of Invention with Commercial Products (Based on Ratios Between Selected Odorants)

Figure 8A:
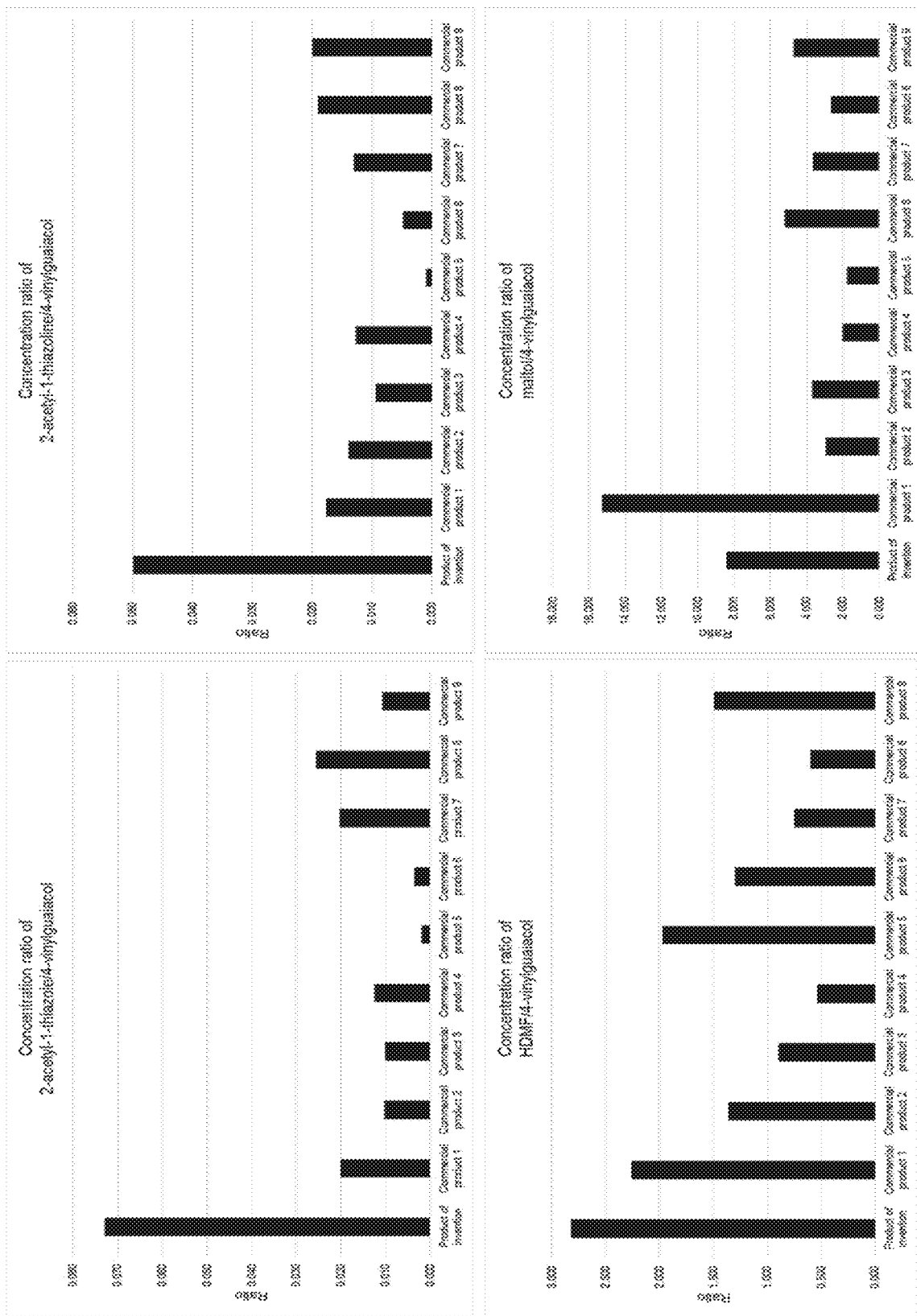
FIG. 8 reports concentration ratios of selected odorants obtained in the product produced by the method of invention according to Example 3 and Formula B compared with the ratios obtained for nine cereal products available commercially. In particular, concentration ratios of 2-acetyl-1-thiazole (roasty), 2-acetyl-1-thiazoline (roasty), HDMF (caramel) and maltol (caramel) to 4-vinylguaiacol (clove-like) (FIG. 8a) and to 3-methylbutanal (malty, cheesy) (FIG. 8b).
Figure 8B:
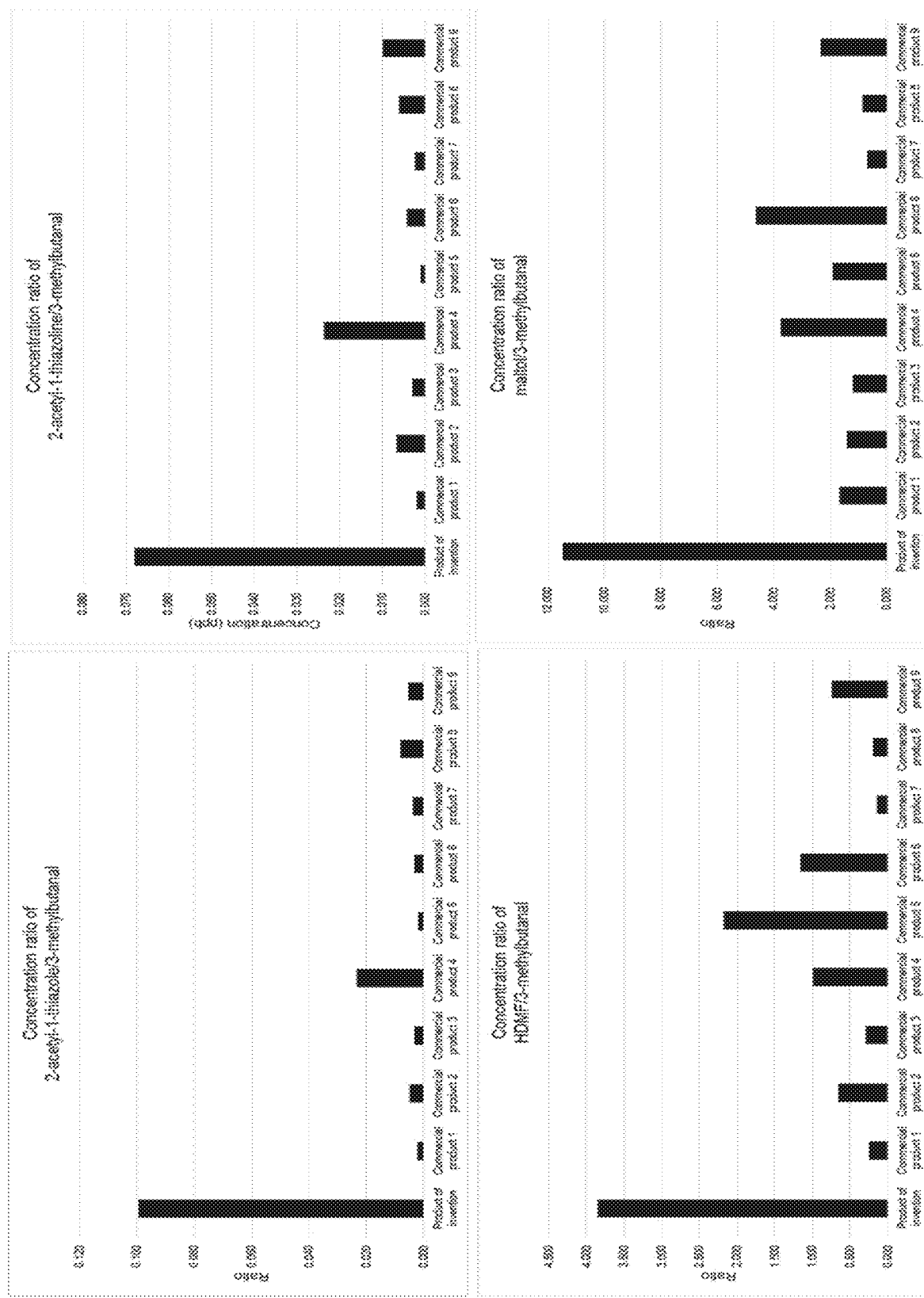

Concentration ratios of selected odorants obtained in the product produced by the method of invention according to Example 3 and Formula B were compared with the ratios obtained for nine cereal products available commercially. In particular, concentration ratios of 2-acetylthiazole (roasty), 2-acetyl-1-thiazoline (roasty), HDMF (caramel) and maltol (caramel) to 4-vinylguaiacol (clove-like) and to 3-methylbutanal (malty, cheesy) were compared and reported in FIG. 8.

Ratios of 2-acetylthiazole (roasty) and 2-acetyl-1-thiazoline (roasty) to 4-vinylguaiacol (clove-like) and to 3-methylbutanal (malty, cheesy) were found consistently higher in the product of the invention as compared to commercial products.

Out of eight ratios, six ratios were found significantly higher in the product of invention than in commercial products demonstrating thus unique aroma profile of the product obtained by method of invention.

Example 12 Assessment of Importance of Flavour Impact of Selected Odorants

In order to get a rough estimate of the flavour impact of selectively increased aroma compounds, odour activity values (OAVs) were determined in cereal samples prepared according to Examples 1-3. OAV was calculated by dividing the concentration of an odorant determined in the sample to its orthonasal odour threshold. Orthonasal odour thresholds in water available from the literature (Rychlik, M., Schieberle, P. Grosch, W. Compilation of Odor Thresholds, Odor Qualities and Retention Indices of Key Food Odorants; Deutsche Forschungsanstalt für Lebensmittelchemie: Garching, Germany, 1998) were used for the OAV calculations, namely 10.0 ppb for 2-acetyl-1-thiazole, 1.0 ppb for 2-acetyl-1-thiazoline and 5.0 ppb for HDMF. Calculated OAVs are reported in Table 5.

It was demonstrated that method of invention increased concentration of 2-acetyl-1-thiazole in both Formulas A and B above the odor threshold (OAV>1), and thus caused that this odorant become sensorically relevant. On the other hand, amounts of 2-acetyl-1-thiazole generated by other two manufacturing concepts were below the odor threshold (OAV<1), therefore sensorically irrelevant. OAVs of 2-acetyl-1-thiazoline and HDMF were far above one, yet, it was demonstrated that method of invention led to superior increase of OAV of both odorants as compared to other two manufacturing concepts.

The invention claimed is:

1. A process for preparation of a heat-treated cereal-based food product, the process comprising:
    forming a wet mixture of water, bulking agent, dairy protein, reducing sugar, and fat;
    subjecting the wet mixture to a temperature between 100° C. and 150° C. under a pressure between 2 bars and 7 bars for a time between 5 minutes and 20 minutes to produce a pre-reacted fraction;
    combining the pre-reacted fraction with a cereal-based ingredient to form a cereal-based food preparation, wherein the pre-reacted fraction is added to the cereal-based ingredient in an amount between 3 and 30 dry w/w of the cereal-based food preparation; and
    subjecting the cereal based food preparation to heat treatment and drying to form the heat-treated cereal-based food product.

2. The process according to claim 1, wherein the forming of the wet mixture is performed at a temperature between 60° C. and 80° C.

3. The process according to claim 1, wherein the wet mixture is pumped at a temperature between 40° C. and 80° C. into an equipment where the combining is performed.

4. The process according to claim 1, wherein the wet mixture has a total solid content between 65% and 90% dry w/w of the wet mixture.

5. The process according to claim 1, wherein the pH of the wet mixture is between 6 and 8.

6. The process according to claim 1, wherein the pre-reacted fraction is cooled at a temperature between 50° C. and 80° C. before the combining takes place.

7. The process according to claim 1, wherein the wet mixture comprises the bulking agent in an amount of between 40% and 70% dry w/w of the wet mixture.

8. The process according to claim 1, wherein the wet mixture comprises the dairy protein in an amount of between 5% and 25% dry w/w of the wet mixture.

9. The process according to claim 1, wherein the wet mixture comprises the fat in an amount of between 10% and 25% dry w/w of the wet mixture.

10. The process according to claim 1, wherein the wet mixture comprises the water in an amount of between 10% and 30% w/w of the wet mixture.

11. The process according to claim 1, wherein the step of subjecting the cereal based food preparation to heat treatment and the step of drying to form the heat-treated cereal-based food product are carried out simultaneously.

12. The process according to claim 1, wherein the heat-treated cereal-based food product comprises odorants comprising 2-acetyl-1-thiazole and 2-acetyl-1-thiazoline, and the contents of 2-acetyl-1-thiazoline and 2-acetyl-1-thiazole

TABLE 5

| | Formula A | | | Formula B | | |
| --- | --- | --- | --- | --- | --- | --- |
| Odorant | Standard roller speed | Reduced roller speed | Standard roller speed with pre-reacted fraction | Standard roller speed | Reduced roller speed | Standard roller speed with pre-reacted fraction |
| 2-acetyl-1-thiazole | 0.49 | 0.70 | 1.89 | 0.62 | 0.85 | 2.26 |
| 2-acetyl-1-thiazoline | 4.37 | 10.30 | 13.86 | 5.61 | 10.69 | 15.49 |
| HDMF | 32.47 | 89.76 | 125.11 | 40.94 | 77.62 | 175.40 | in the heat-treated cereal-based food product are increased compared to another product made by a conventional approach without the pre-reacted fraction.

13. The process according to claim 1, wherein the heat-treated cereal-based product comprises odorants comprising 2-acetyl-1-thiazole, 4-vinylguaiacol, 2-acetyl-1-thiazoline, and 3-methylbutanal, wherein
- a first ratio between a concentrations of 2-acetyl-1-thiazole to a concentration of 4-vinylguaiacol is equal or higher than 0.02 and a second ratio between a concentration of 2-acetyl-1-thiazoline to the concentration of 4-vinylguaiacol is equal or higher than 0.02; and/or
- a third ratio between the concentration of 2-acetyl-1-thiazole to a concentration 3-methylbutanal is equal or higher than 0.035 and a fourth ratio between the concentration of 2-acetyl-1-thiazoline to the concentration of 3-methylbutanal is equal or higher than 0.040.

14. The process of claim 1, wherein the subjecting of the wet mixture to the temperature between 100° C. and 150° C. is performed under a pressure between 3 bars and 6 bars.

15. The process of claim 1, wherein the pre-reacted fraction is added to the cereal-based ingredient in an amount between 5 and 20 dry w/w of the cereal-based food preparation.

16. The process according to claim 1, wherein the wet mixture has a total solid content between 70% and 90% dry w/w of the wet mixture.

17. The process according to claim 1, wherein the pH of the wet mixture is between 6 and 7.

18. The process according to claim 1, wherein the subjecting of the cereal-based food preparation to the heat treatment and the drying to form the heat-treated cereal-based food product are carried out simultaneously via roller drying, wafer or biscuit baking toasting treatments.

* * * * *